Patented July 14, 1931

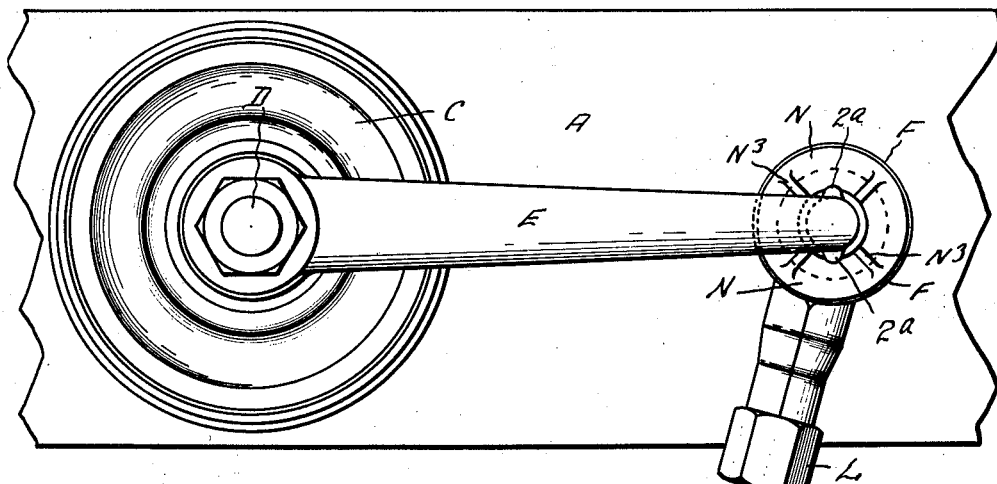
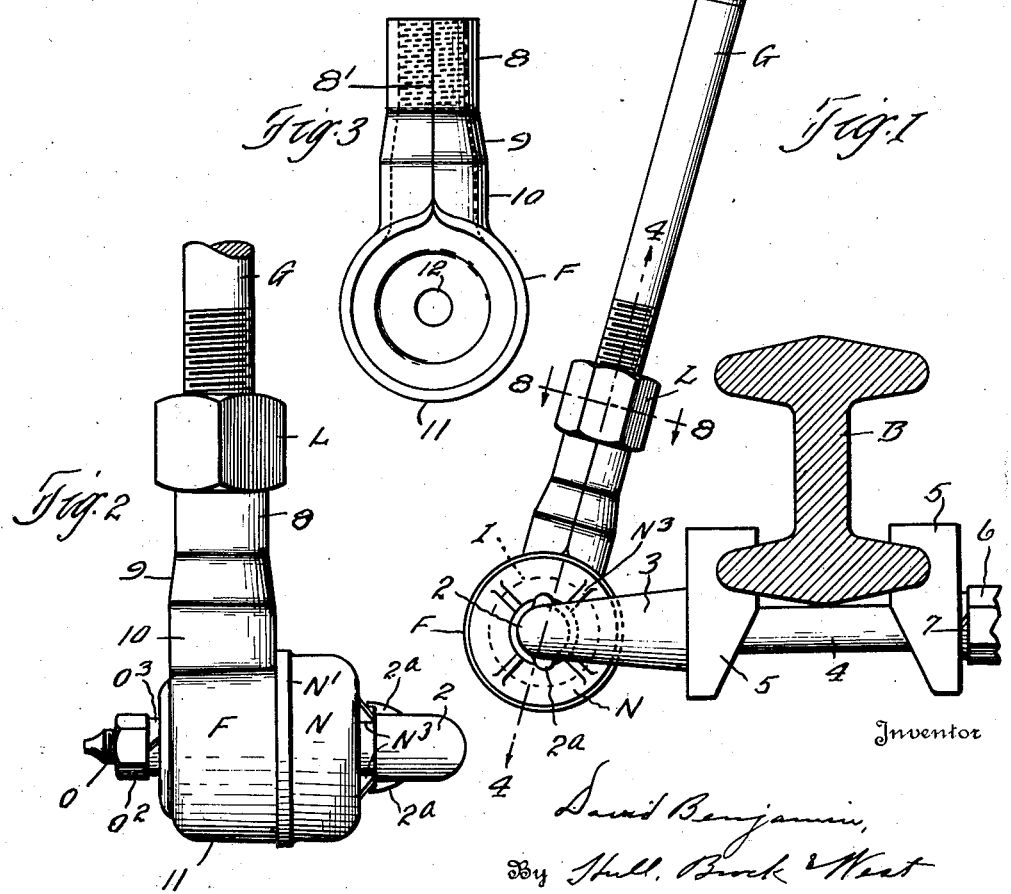

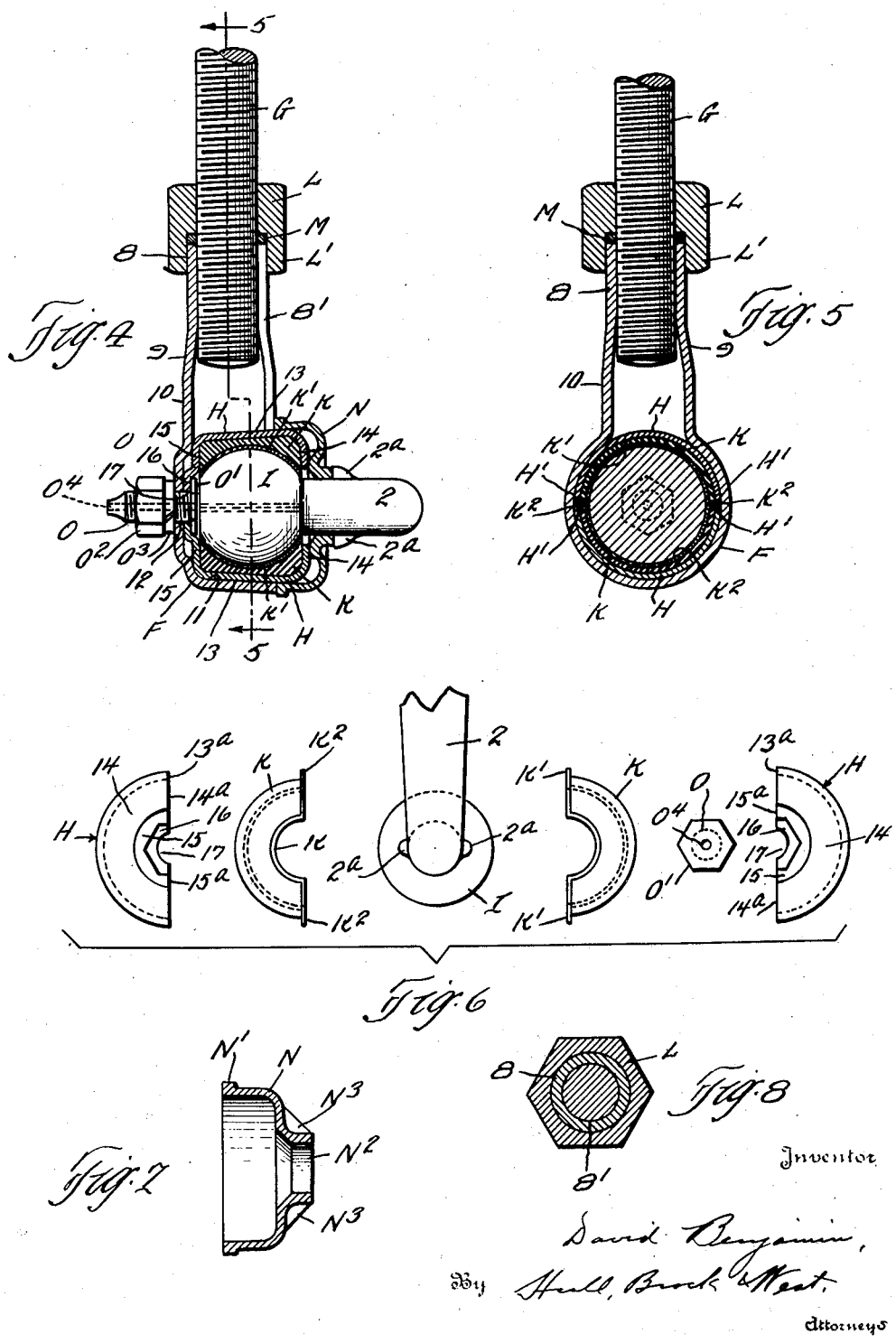

1,814,999

UNITED STATES PATENT OFFICE

DAVID BENJAMIN, OF CLEVELAND HEIGHTS, OHIO, ASSIGNOR TO THE GABRIEL COMPANY, OF CLEVELAND, OHIO, A CORPORATION OF OHIO

BALL AND SOCKET CONNECTION

Application filed October 12, 1928. Serial No. 312,043.

This invention relates to ball-and-socket connections and, while the connection illustrated and described herein is particularly suited for use as a means for operating shock absorbers for vehicles, it is capable of other uses and of wider applications than the one thus specifically mentioned.

The general purpose and object of the invention is to provide an efficient connection of the type referred to, and more particularly to provide a socket mounting which may be conveniently assembled and disassembled; which will be effective as a mounting for the cooperating ball; which will prevent the entrance of dust to and between the working parts thereof; and which is provided with means for lubricating the working parts thereof.

Further and more limited objects and advantages of the invention will appear hereinafter in the detailed description.

Referring to the drawings, Fig. 1 represents a sectional side elevation of the side frame and axle of an automobile having a shock absorber applied thereto and including a connecting rod having my invention embodied thereon; Fig. 2, a detail in side elevation of the lower end of the connecting rod and the parts cooperating therewith; Fig. 3 an elevation of the housing and its connecting-rod extension; Fig. 4 a vertical central sectional view through the lower end of the connecting rod and the cooperating parts; Fig. 5 a detail in section corresponding to the line 5—5 of Fig. 4, and looking in the direction of the arrows; Fig. 6 a detail in elevation of the lower bracket and the cooperating parts of the lining and cup members of the socket; Fig. 7 a detail in section of the dust cap; and Fig. 8 a detail in section corresponding to the line 8—8 of Fig. 1, and looking in the direction of the arrows.

Describing the parts by reference characters, A denotes a side frame member and B an axle of an automobile. Secured to the side frame member is the casing C of a liquid-containing shock absorber. Projecting from the casing is the shaft D which operates a vane or piston (not shown) within the casing, while E denotes an arm secured to the shaft and having at its outer end a stud carrying a ball 1 mounted in a socket housing, indicated generally at F. The socket housing is carried by a connecting rod G, which is longitudinally adjustable, having at its lower end another housing F, preferably identical in construction with the upper housing. The lower housing also receives a ball 1 on a stud 2 projecting from an arm 3 constituting an extended head of a bolt 4, by means of which bolt and a pair of clamps 5, through which the bolt extends, the said arm and ball are supported from the axle. The bolt is provided with a nut 6 and a washer 7.

As stated hereinbefore, the socket mountings are identical; and a detailed description of one of these mountings will suffice for both mountings, the one shown in detail herein being the one at the lower end of the rod G.

Each socket mounting comprises the housing F referred to hereinbefore. The housing is formed as part of a connection secured to and constituting an extension of the rod G. The combined housing and connection comprises a sheet metal stamping the upper portion of which is rolled into tubular form, said upper portion comprising a reduced cylindrical internally threaded part 8 connected by a frusto-conical part 9 with a lower cylindrical part 10 which in turn carries the housing F. For convenience of description, the left hand side of the housing will be referred to as the rear and the opposite open portion of the housing as the front. The housing F is generally frusto-conical in shape, tapering from front to rear, as indicated at 11. The bottom or rear end of the housing is closed except for a central circular opening 12, the purpose of which will be explained hereinafter.

The housing receives therewithin a bearing for the cooperating ball 1, the said bearing consisting of a plurality of bearing parts which will now be described.

H denotes a pair of symmetrical outer cup members which are tapered or frusto-conical from front to rear, as indicated at 13, whereby they may fit snugly within the tapered or frusto-conical part of the housing 11. Each cup member has at its front an inwardly projecting semi-annular flange 14 and at its rear a rearwardly and inwardly projecting semi-annular flange 15 adapted to engage the rear wall of the housing F. The cup members H are adapted to be inserted into the housing from front to rear and are preferably arranged with their proximate edges 13$^a$, 14$^a$ and 15$^a$ in a horizontal plane. In the flanged portion 15 of each member H there is provided a depressed angular half-seat 16 surrounding the semi-circular opening 17 in the center of such flange.

Mounted within the cup formed by the members H, H are socket bearing members consisting each of an outer body or backing K, made preferably of soft rubber and preferably having cemented, or otherwise secured thereto, an inner lining K' of anti-friction metal, such as graphite bronze. The graphite bronze lining of each of these members is formed as a segment of a sphere approximating a hemisphere; and the outer surface of each of the backings K is shaped so as to fit within the cup members H, H. In order to retain the parts K, K' against rotation, the lining members K' are provided with flanges K$^2$ which are adapted to be received between the proximate edges H' of the cup members H, H—see Figs. 5 and 6. By virtue of this construction of the lining members K', K$^2$, it is not necessary to secure the rubber members K to said lining members.

When assembled, the bearing members K, K' provide a front opening of sufficient size to receive therein and to accommodate the movements of the stud 2.

The manner of forming the housing F provides a tubular extension 8 within which the adjacent threaded end of the rod G is received. Mounted on each end of said rod G is a nut L having a sleeve L' adapted to receive and form a close fit about the end 8 of the adjacent housing extension. By setting up the nut L, the parts H are clamped tightly about the cooperating ends of the rod G, this clamping action being facilitated by the seam 8' formed between the edges of the tubular part 8. A lock washer M is interposed between the end of each part 8 and the body of the nut L.

For the purpose of excluding dust from the connection, I provide a hard rubber dust cap N having a base flange N' adapted to engage the front face of the housing F and provided with a central forwardly extending neck N$^2$ having an opening therethrough adapted to fit the stud 2. Strengthening ribs N$^3$ connect the neck with the body of the cap; and the stud 2 is provided with lugs 2$^a$ adapted to engage the neck thereby to retain the cap in place.

For the purpose of lubricating the parts, a hollow cup screw O is provided, the same having an angular head O' adapted to be received in the seat provided by the cooperating parts 17 at the bottom of the cup members H. This screw extends through an opening in the bottom or rear of the housing F and is secured in place by means of a nut O$^2$ and a lock washer O$^3$. The screw is provided with a bore O$^4$ for the reception of a grease gun, whereby the interior of the mounting may be lubricated.

In assembling, the head O' of the cup screw O is placed in the bottom of one of the cup sections H. The parts K and K' are then inserted into their respective cup sections, and the cup sections, with the parts K and K' therein, are slipped over the ball 1. The assembly then is pushed into the housing F with the cup screw O passing through the opening 12 in the bottom or rear wall of the housing, after which the washer O$^3$ and nut O$^2$ are applied, and the nut is set up to draw the parts to their seats. The dust cap N is softened by placing the same in hot water, which will allow it to be stretched sufficiently to be slipped over the stud 2 and over the lugs 2$^a$ thereon and, being in such softened condition, will assume the shape shown in Fig. 4, retaining the shape after cooling and hardening.

The construction described and illustrated herein provides a very efficient ball-and-socket connection which may be quickly and conveniently assembled and disassembled; which will protect the working parts against the access of dust; which will insure proper lubrication between the working parts; and which, when used with a shock absorber, will, by virtue of the cushioning parts K, K, prevent the transmission of shocks and noises to the chassis of the automobile to which the shock absorber is applied.

Having thus described my invention, what I claim is:—

1. A socket mounting comprising a housing having a frusto-conical body tapered rearwardly from an open front and also having a rear wall, a pair of symmetrical bearing members each consisting of an inner hemispherical anti-friction lining, an outer semi-frusto-conical backing of cushioning material, and a metallic semi-frusto-conical cup member for each such backing, the said cup members each having a rear wall provided with a central opening, a lubricant-supplying member having a head mounted in the rear wall of the cup formed by the cup members and having a stem extending through the opening thereof and through an opening in the rear wall of the housing, and a nut on the rear end of said connection adapted to operatively engage the rear wall of the housing thereby to retain the cup and the parts therewithin in place within the housing.

2. A socket mounting comprising a housing having an open front and a rear wall, a pair of symmetrical bearing members each consisting of an inner hemispherical anti-friction lining, an outer backing of cushioning material, and a metallic cup member for each such backing, the said cup members having each a rear wall provided with a central opening, a lubricant-supplying member having a head mounted in the rear wall of the cup formed by the cup members and having a stem extending through the opening thereof and through an opening in the rear wall of the housing, and a nut on the rear end of said connection adapted to operatively engage the rear wall of the housing thereby to retain the cup and the parts therewithin in place within the housing.

3. A socket mounting comprising a housing having a frusto-conical body tapered rearwardly from an open front and also having a rear wall, a pair of symmetrical bearing members each consisting of an inner hemispherical anti-friction lining, an outer semi-frusto-conical backing of cushioning material fitting the outer surface of each lining member, and a semi-frusto-conical cup member for each such backing, each cup member having a front inwardly extending semi-annular flange engaging the backing material therein and also a rear inwardly extending semi-annular flange, the central portion of each rear flange being rearwardly offset and providing, when the cup members are assembled, an angular seat with an opening within said seat, and a connecting member having an angular head within the seat thus formed and provided with a stem extending through the opening thereof and through an opening in the rear wall of the housing, the said connection having thereon means for clamping the cup members within the housing and being provided with a bore for supplying lubricant therethrough to the parts within the said cup.

4. A socket mounting comprising a housing having an open front and also having a rear wall, a pair of symmetrical bearing members each consisting of an inner hemispherical anti-friction lining, an outer backing of cushioning material fitting the outer surface of each lining member, and a cup member for each such backing, each cup member having a front inwardly extending flange engaging the backing material therein and each also having a rearwardly extending flange, the central portion of each rear flange providing, when the cup members are assembled, a seat with an opening within said seat, and a connecting member having a head within the seat thus formed and provided with a stem extending through the opening thereof and through an opening in the rear wall of the housing, the said connection having thereon means for clamping the cup members within the housing and being provided with a bore for supplying lubricant therethrough to the parts within the said cup.

5. A socket mounting comprising a housing having an open front and a wall at the back thereof, a cup adapted to be inserted into said housing through the open front wall thereof and having a rear wall with an opening therethrough registering with an opening in the rear wall of the housing, a bearing for a ball within the said cup, and a connection for supplying lubricant to the interior of said cup and to the bearing therewithin, the said connection extending through the openings in the rear walls of the cup and housing.

6. A socket mounting comprising a housing having an open front and a wall at the back thereof, a cup adapted to be inserted into said housing through the open front wall thereof and having a rear wall with an opening therethrough registering with an opening in the rear wall of the housing, a bearing for a ball within the said cup, a connection comprising a stem extending through the openings in the rear walls of the cup and housing and having a head within and engaging the part of the rear wall of the cup which surrounds said opening, and a nut on said connection for securing the same in place with its rear portion projecting through and beyond the rear wall of the housing, the said connection having a bore therethrough for the supplying of lubricant to the interior of the cup and to the parts therewithin.

7. A socket mounting comprising a frusto-conical housing having an open front, a pair of cup members fitted within the said housing with their proximate edges spaced apart, a hemispherical lining member within each cup member, the said lining members having outwardly extending flanges interposed between the proximate edges of the cup members, a shock absorbing backing member interposed between each lining member and its cooperating cup member, and means for securing the cup members in place within the housing.

8. A socket mounting comprising a housing having an open front, a pair of cup members fitted within the said housing with their proximate edges spaced apart and having each a rear wall provided with a central angular depression adjacent the central opening in such wall, a hemispherical lining member within each cup member, the said members having outwardly extending flanges interposed between the proximate edges of the cup members, a shock absorbing backing member interposed between each lining member and its cooperating cup member, and a lubricating connection having an angular head within the seat provided by the depressions in the rear walls of the cup members and a stem extending through the central opening provided in the rear wall of such cup members and through the rear wall of the housing, and means cooperating with said connection to anchor the said cup members within the housing.

In testimony whereof, I hereunto affix my signature.

DAVID BENJAMIN.